United States Patent
McNeely et al.

(10) Patent No.: US 8,215,330 B2
(45) Date of Patent: Jul. 10, 2012

(54) ADJUSTABLE RECIRCULATING VALVE

(75) Inventors: Michael D. McNeely, Katy, TX (US); Howell A. Smith, Houston, TX (US)

(73) Assignee: Tyco Valves & Controls, LP, Houston, TX (US)

( * ) Notice: Subject to any disclaimer, the term of this patent is extended or adjusted under 35 U.S.C. 154(b) by 350 days.

(21) Appl. No.: 12/689,364

(22) Filed: Jan. 19, 2010

(65) Prior Publication Data
US 2010/0206391 A1    Aug. 19, 2010

Related U.S. Application Data

(63) Continuation-in-part of application No. 11/693,839, filed on Mar. 30, 2007, now abandoned.

(51) Int. Cl.
*G05D 7/00* (2006.01)
(52) U.S. Cl. ......... 137/115.06; 137/115.05; 137/115.04; 137/115.14; 137/115.16; 137/115.24; 251/251
(58) Field of Classification Search ............. 137/115.04, 137/115.05, 115.06, 115.14, 115.15, 115.16, 137/115.24, 118.04; 251/251
See application file for complete search history.

(56) References Cited

U.S. PATENT DOCUMENTS

| 120,925 | A | * | 11/1871 | Allen | 137/115.06 |
|---|---|---|---|---|---|
| 606,053 | A | * | 6/1898 | Dehnel | 137/115.06 |
| 2,905,433 | A | * | 9/1959 | Till et al. | 251/251 |
| 3,068,882 | A | * | 12/1962 | Odendahl | 137/115.05 |
| 3,517,687 | A | * | 6/1970 | Nordt | 137/115.06 |
| 4,019,527 | A | * | 4/1977 | Brand | 137/115.26 |
| 4,095,611 | A | * | 6/1978 | Hetz | 137/115.23 |
| 4,243,064 | A | * | 1/1981 | Nolte | 137/115.04 |
| 4,244,388 | A | * | 1/1981 | Feiss | 137/115.16 |
| 4,779,639 | A | * | 10/1988 | Loos et al. | 137/115.05 |
| 4,941,502 | A | * | 7/1990 | Loos et al. | 137/115.05 |
| 4,967,783 | A | * | 11/1990 | Loos | 137/115.05 |
| 5,172,716 | A | * | 12/1992 | Paptzun | 137/115.05 |
| 5,333,638 | A | * | 8/1994 | Maxwell | 137/115.04 |
| 5,497,801 | A | * | 3/1996 | Kusunose et al. | 137/115.04 |
| 5,549,131 | A | * | 8/1996 | Maxwell et al. | 137/115.18 |
| 6,357,467 | B1 | * | 3/2002 | Ringer | 137/119.01 |

* cited by examiner

*Primary Examiner* — Eric Keasel
*Assistant Examiner* — Minh Le

(57) ABSTRACT

An adjustable automatic recirculation valve includes a valve body, a main valve disk, a bypass valve and a dynamic adjustment assembly. The main valve disk is positioned within the valve body and opens in response to fluid flow between a main inlet and a main outlet. The bypass valve controls the flow of fluid between the main inlet and the recirculating outlet. A dynamic adjustment assembly, housed within the valve body controls the operating lift associated with the maximum opening of the bypass valve to regulate fluid flow capacity to the recirculating outlet.

12 Claims, 4 Drawing Sheets

ADJUSTABLE RECIRCULATING VALVE

FIELD OF THE INVENTION

The present invention relates generally to automatic recirculation valves and more particularly to recirculation valves having the ability to adjust the bypass recirculation flow to accommodate for various flow ranges.

BACKGROUND OF THE INVENTION

Automatic recirculation (ARC) valves are typically used in the oil and gas, power and chemical industries. In particular, ARC valves are used in connection with centrifugal pump applications to prevent pump overheating caused by the transfer of heat from a pump mechanism to the process fluid flowing through a system. During normal operation, this heat is transferred away from the pump and dissipated through the system via the process fluid. However, during periods of low process flow, the slower moving fluid does not dissipate the heat away from the pump sufficiently, thereby contributing to pump overheating. In addition, the vapor pressure increases as the temperature of the fluid within the pump increases, thereby increasing cavitation potential which damages the pump mechanism.

Recirculation valves are used to prevent this overheating by providing a path through which the pump maintains sufficient fluid flow during periods of low process flow through the system. Fluid enters a recirculation valve though a main inlet and exits the valve through a main outlet. The main valve element senses the rate of flow between the main inlet, and outlet. A pressure differential across the main valve element causes the valve to open to permit process flow to the main outlet. When the main valve is open, a recirculation or bypass portion of the valve is closed which prevents the flow of fluid to an associated recirculation outlet. During times of low downstream demand, the differential pressure across the main valve is insufficient to open the valve. When the main valve is closed, the recirculation or bypass valve is open which allows for the flow of fluid through the recirculation chamber and consequently to the recirculation outlet.

A drawback associated with the above referenced ARC valve is that the capacity through the bypass valve is fixed depending on the application. For example, the bypass valve may be configured to accommodate a particular bypass Cv. Unfortunately, when ARC valves are installed in the field, the Cv rating may or may not be ideal for actual process conditions. Thus, field changes must be done manually to accommodate for the design differentials. The above-referenced drawbacks and others are overcome by the present invention described herein with reference to the detailed description, drawings and appended claims.

SUMMARY OF THE INVENTION

The present invention relates to an adjustable automatic recirculation valve having a main valve body, a main valve disk, a bypass valve and a dynamic adjustment assembly. The valve body includes a main inlet, a main outlet and a recirculating outlet. The main valve disk is positioned within the valve body opens in response to fluid flow between the main inlet and main outlet. A bypass valve, responsive to opening and closing of the main valve, controls the flow of fluid between the main inlet and the recirculating outlet. A dynamic adjustment assembly is housed within the valve body and is configured to control the operating lift associated with the maximum opening of the bypass valve to regulate fluid flow capacity to the recirculating outlet.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE EMBODIMENTS

Figure 1:
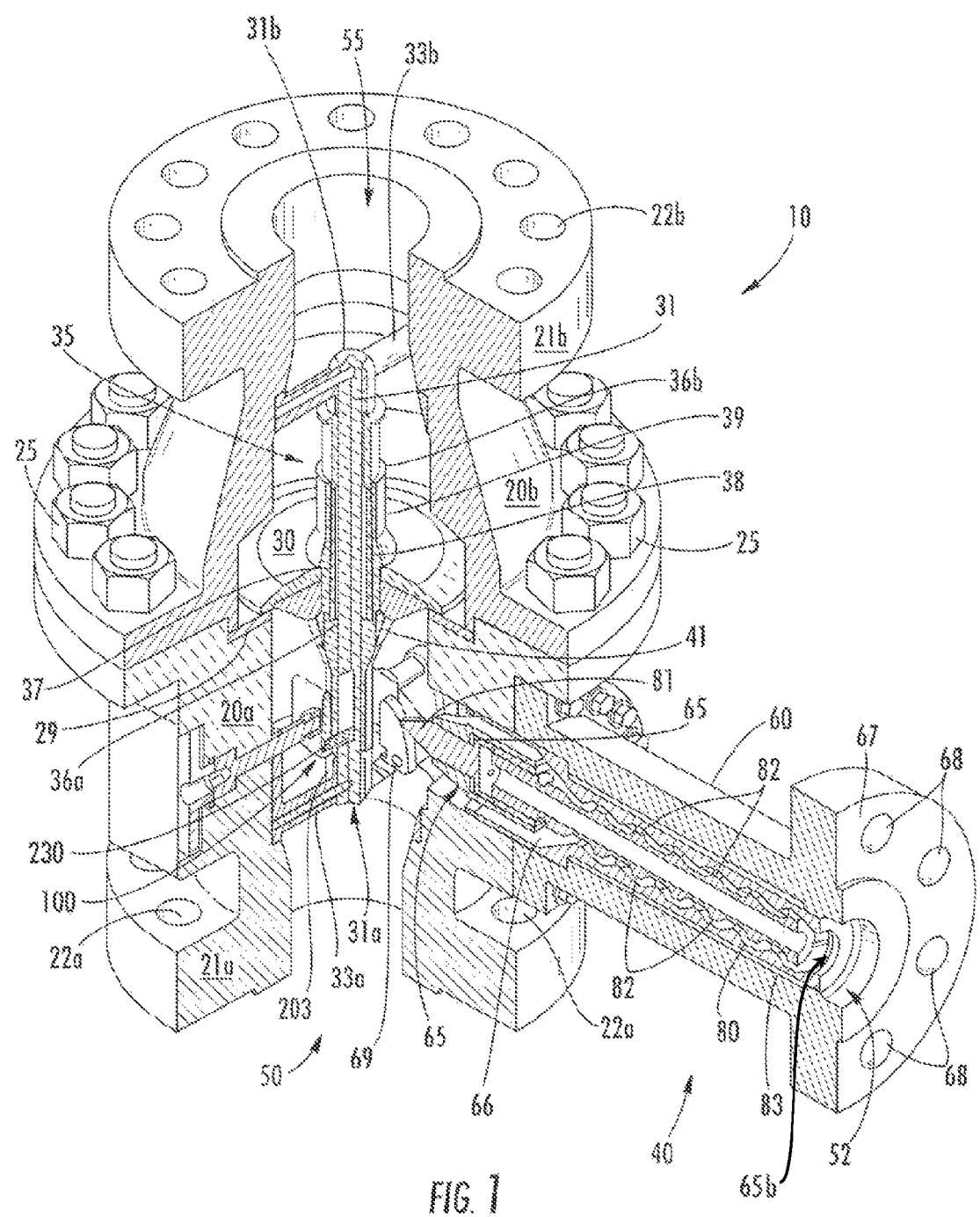
FIG. 1 illustrates a cut-away perspective view of an ARC valve in a closed position according to an embodiment of the present invention.

The present invention will now be described more fully hereinafter with reference to the accompanying drawings, in which preferred embodiments of the invention are shown. This invention may be embodied in many different forms and should not be construed as limited to the embodiments set forth herein. These embodiments are provided so that the disclosure will be thorough and complete, and will convey the scope of the invention to those or ordinary skill in the art. In the drawings, like numbers refer to like elements.

FIG. 1 illustrates an exemplary embodiment of a recirculation main valve 10 in a closed position having housing sections 20a and 20b, a valve disk 30 enclosed within the housing 20, a bypass or recirculation portion 40 and an adjustable recirculation assembly 100. The housing sections may be connected using bolts 25 to form an internal cavity 35 through which fluid flows. Valve 10 has an inlet 50 located at one end of housing portion 20a which is aligned with a downstream side of a centrifugal pump (not shown) for receiving process fluid. Flanged portion 21a of housing section 20a includes a plurality of mounting holes 22a for mounting valve 10 to the downstream side of a process system. Valve 10 also includes an outlet 55 located at the other end of housing portion 20b configured to provide process fluid away from valve 10. Flanged portion 21b of housing section 20b includes a plurality of mounting holes 22b for mounting valve 10 to the upstream side of a process system.

Disk 30 of the main valve is movably positioned along center shaft 31 which extends longitudinally from housing portions 20a to 20b. Disk 30 communicates with disk seat 29 which is positioned between housing portions 20a and 20b and provides a seal to prevent process from reverse flow between outlet 55 and inlet 50. Seat 29 extends circumferentially around the outer perimeter of disk 30. Shaft 31 is fixedly attached at a first end 31a to the internal walls of housing portion 20a via bracket 33a which will be described in greater detail with reference to FIG. 2A. Likewise, shaft 31 is fixedly attached at a second end 31b to the internal walls of housing portion 20b via bracket 33b. Brackets 33a and 33b are substantially perpendicular to the longitudinal axis of shaft 31 and are configured to withstand the forces associated with fluid flow through valve 10. Bracket 33b includes a circular base which is integrally formed with the interior wall of housing section 21a and a mid-diameter beam similar to that disclosed in FIG. 2A adapted to receive an end 31b of shaft 31. However, bracket 33b does not include the side portions 202 shown in FIG. 2A.

Sleeve 39 includes a annular internal recess 37 extending longitudinally from 36A to 36B. Recess 37 is configured to receive a bias spring 38 which, in its static position, exerts a force on disk 30 into a fully closed position such that disk 30 engages seat 29 to prevent reverse process flow through valve 10. A shaft sleeve is connected to the disk 30 coaxial to the center of the disk. Sleeve 39 includes a threaded conical portion 41 which also extends around the lower side of disk 30 a radius distance from shaft 31. Consistent with existing check valve functionality, when the differential pressure is sufficient, disk 30 is vertically displaced upward along shaft 31 toward outlet 55 against bias spring 38. The vertical displacement of disk 31 breaks the seal with seat 29 causing process fluid to flow from inlet 50 through cavity 35 to outlet 55.

Bypass or recirculation portion 40 generally includes a bypass valve 65, body 60, cavity 66, recirculation port 52, piston 80 and flanged portion 67. A plurality of mounting holes 68 are spaced along flanged portion 67 for mounting recirculation portion 40 to bypass piping. Body 60 is integrally formed with valve housing section 20a and cavity 66 is defined by the interior walls of body 60. Piston 80 is movably positioned within cavity 66 and corresponds to the movement of valve disk 30. Piston 80 engages bypass valve seat 65b within cavity 66 to forma seal through which fluid can not flow. Piston 80 is positioned within cavity 66 and includes head portion 81 and a plurality of cascaded rings 82. Piston 80 includes a central cylindrical passage 83 extending the length of piston 80. The length of piston 80, number of cascaded rings 82 depends on the recirculation pressure and flow needed for a particular application. For example, the number of cascaded rings 82 may be between 1 and 6 to accommodate Cv values typically from 0.2 to 75 and greater. In addition, the diameter of piston 80 is typically between about 1" and 2.5" and greater with cascaded rings 82 having the same diameter range. In this manner, a controlled multi stage pressure reducing bypass system is defined.

Figure 2A:
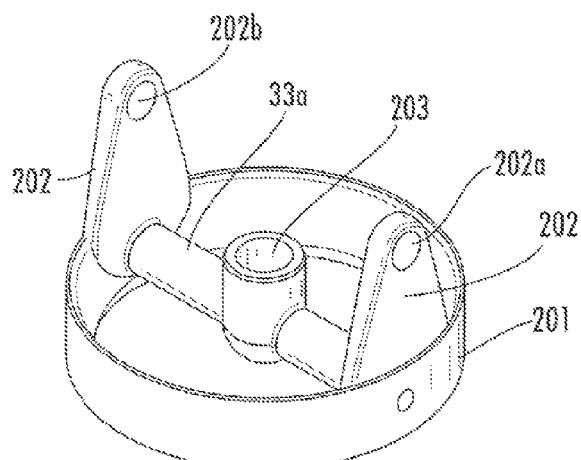
FIG. 2a-2d illustrates perspective views of individual members of adjustable recirculation assembly according to an embodiment of the present invention.
Figure 2B:
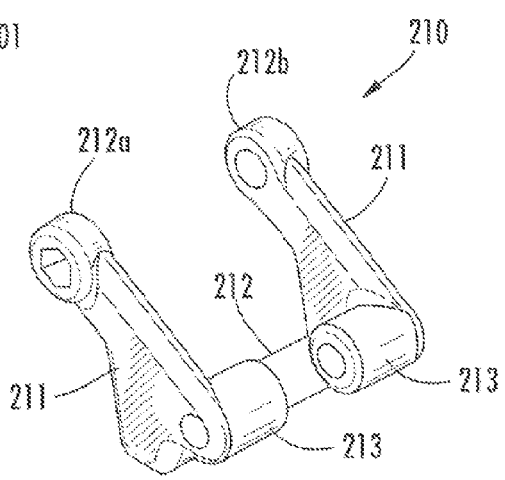
Figure 2C:
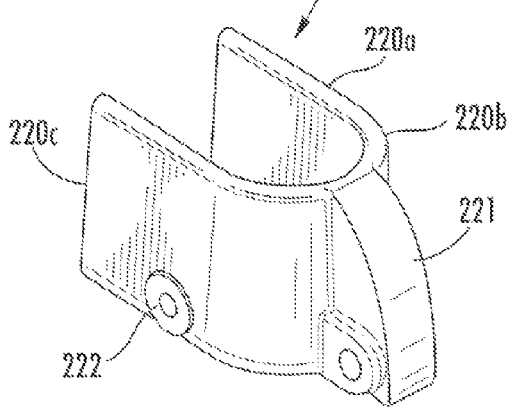
Figure 2D:
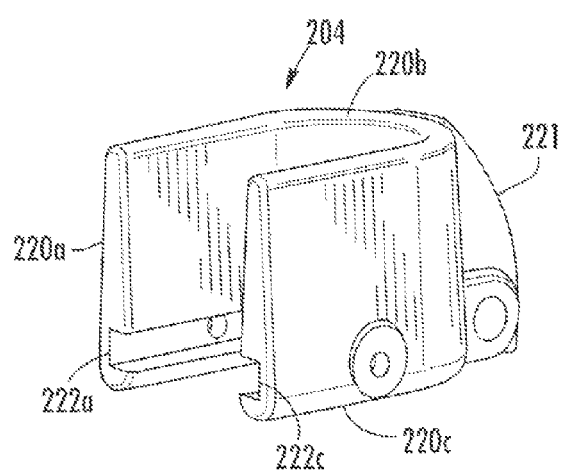

FIG. 2a-2d illustrates perspective views of individual members of adjustable recirculation assembly 100 positioned within housing section 21a and cavity 35. Referring to FIG. 2a, pivot support ring 200 includes ring support 201, bracket 33a, pivot supports 202, and shaft retaining cavity 203. The diameter of retaining cavity 203 is sufficient to receive shaft 31. Ring support 201 has a diameter and circumference such that it is fixedly attached or integrally molded with the interior of housing section 21a. Pivot supports 202 include retaining bores 202a and 202b which are adapted to receive and retain pivot arm 210. FIG. 2b illustrates pivot arm 210 which is positioned and retained by pivot support ring 200. Pivot arm 210 includes extension arms 211, base support beam 212 and lever support arms 213. Extension arms 211 each include receiving portions 212a and 212b which connect to pivot supports 202 via retaining bores 202a and 202b. FIG. 2c is a perspective view of pivot lever 204 which has a substantially horseshoe shape formed by walls 220a, 220b and 220c and is positioned around shaft 31. The front portion of pivot lever 204 is defined by angular lever member 221 received between lever support arms 213. Slots 222 formed in inner walls 220a and 220c are adapted to receive actuator pin 230 (shown in FIG. 1). Turning briefly to FIG. 1, as sleeve 39 traverses shaft 31 in an upward direction toward outlet port 55 caused by the differential pressure about disk 30, sleeve 39 pulls assembly 100 upwards. This movement upwards causes pivot lever 204 to pivot about pivot pin 69 forcing lever 204 to rotate down toward intake 50. In particular, FIG. 2d illustrates a perspective side view of lever 204 having slots 222A and 222C. Slot 222A extends along a lower portion of the interior of wall 220a and slot 222C extends along the lower portion of the interior of wall 220c. Each of the slots 222A and 222C is configured to allow pin 230 (shown in FIG. 1) to traverse within the slots when sleeve 39 traverses shaft 31 in an upward or downward direction caused differential pressure about disk 30.

Figure 3:
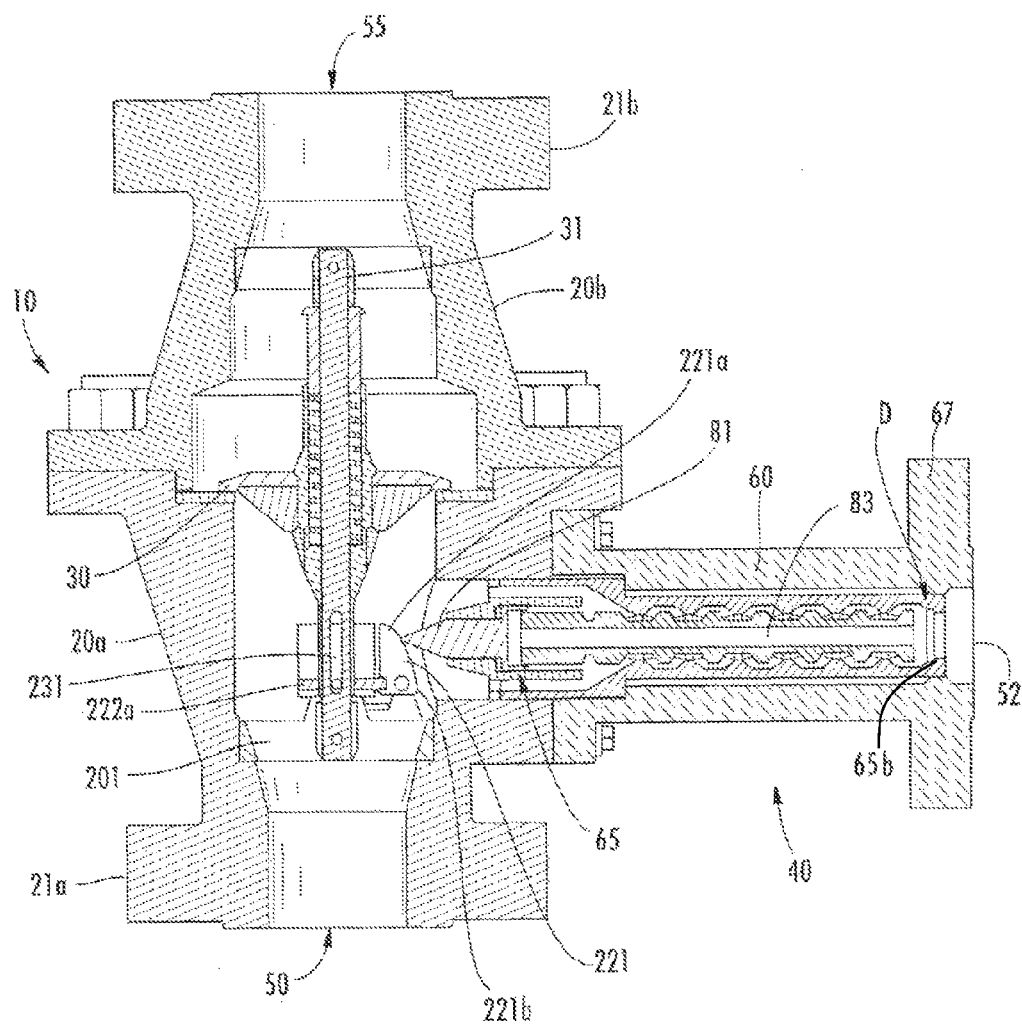
FIG. 3 illustrates a side cut-away view of an ARC valve according to an embodiment of the present invention.

The functioning of assembly 100 and in particular lever 204 may be seen in FIG. 3 which is a side cut-away view of valve 10 with recirculation valve 65 in a open position. As can be seen, head 81 of piston 80 is positioned on angular lever member 221. The position of head 81 on lever member 221 may be adjusted depending on the bypass recirculation valve opening required for a particular application. Thus, if head 81 is positioned higher on angular member 221, i.e. toward end 221a, head 81 will traverse the surface of angular member 221 from the point of contact toward end 221a. Likewise, if head 81 was positioned lower on angular member 221, towards end 221b, head 81 will traverse the surface of angular member 221a lesser distance and thereby force valve 65 to close a lesser distance D. Again, as sleeve 39 traverses shaft 31 in an upward direction toward outlet port 55 caused by the differential pressure about disk 30, sleeve 39 pulls assembly 100 upwards and actuator pin 230 traverses within channel 231 of shaft 31. This movement upwards causes pivot lever arm 210 to rotate downward and pivot lever 204 to pivot about pin 69 once pin 69 is fixed in position due to adjustment of operator shaft 401 (shown in FIG. 4).

Figure 4:
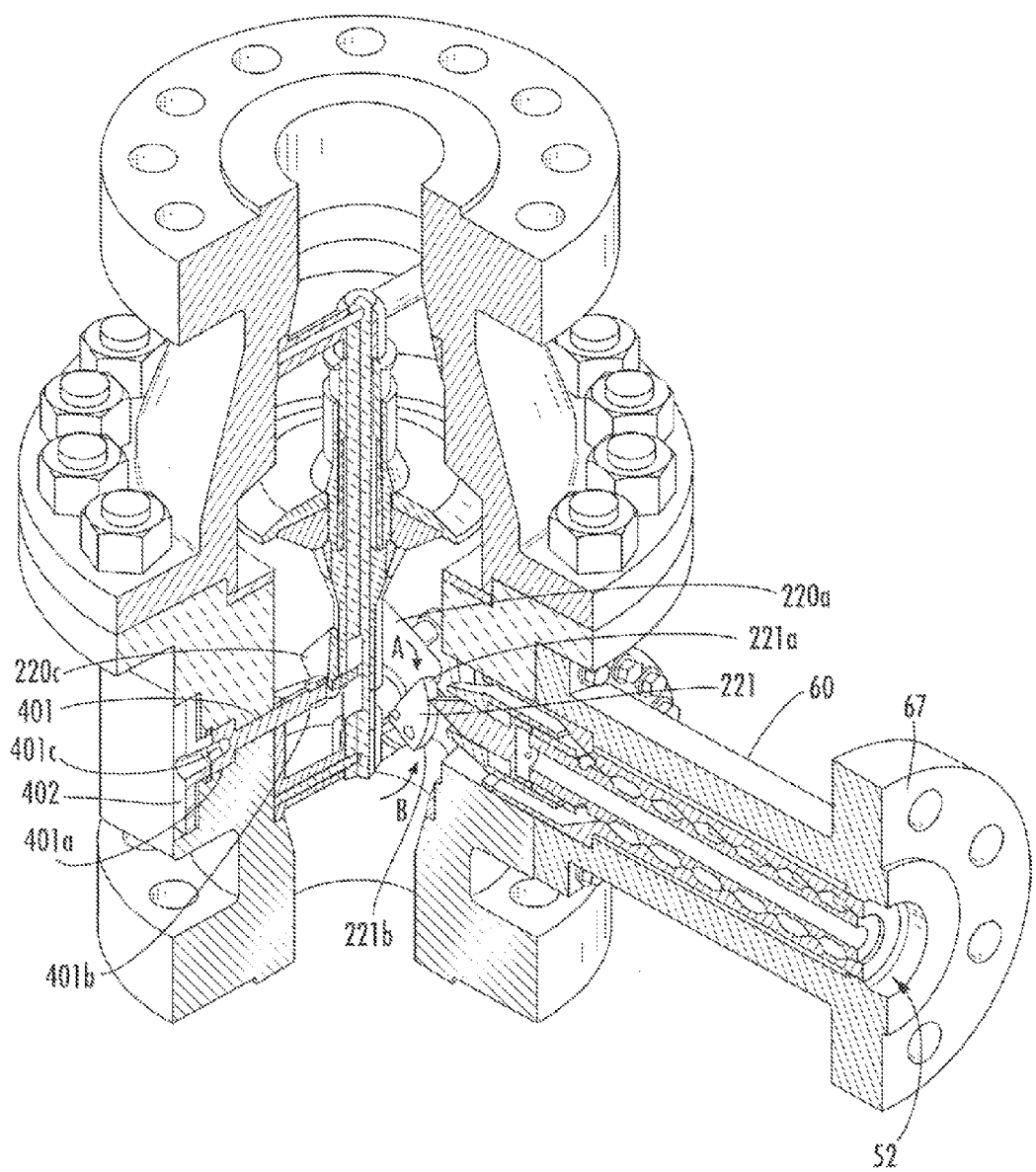
FIG. 4 illustrates a cut-away perspective view of an ARC valve in an open position according to an embodiment of the present invention.

FIG. 4 illustrates valve 10 in an open position whereby the seal between disk 30 and seat 29 is broken allowing process fluid to flow from inlet 50 to outlet 55. As the sleeve 39 and disk 30 vertically traverse shaft 31 toward outlet 55, bypass recirculation assembly 40 likewise moves in relation to shaft 31 as described above. This displacement causes angular member 221 to pivot in direction A. Because piston head 81 is in contact with a point along the surface of angular member 221, the rotation of angular member 221 forces piston head 81, and likewise piston 80, to move toward recirculation outlet 52 within cavity 66, thereby closing bypass valve 65 a distance D (as shown in FIG. 3).

An operator shaft 401 has a first end 401a located at locking plate 402 near the outer surface of housing 20a and extends to a second end 401b for connection with pivot arm 210. Locking plate 402 retains operator shaft 401 in position with housing 20a. Operator shaft 401 is connected to pivot arm 210 which is connected to pivot lever 204. As stated above, pivot lever 204 surrounds shaft 31 on at least three sides with a horseshoe shape and contacts head portion 81 via angular member 221. The first end 401a of operator shaft 401 includes an adjustment head 401c used to adjust operator shaft 401 in receiving portion 212a thereby changing the angle of pivot arm 211 and likewise changing the angle of pivot lever 204. This change forces angular member 221 of pivot lever 204 to move thereby adjusting the point at which head 81 of piston 80 contacts angular member 221. In particular, as operator shaft 401 is adjusted in direction A, pivot arm 211 is displaced downward in direction A which causes pivot lever 204 in direction A. The change in position of pivot lever 204 in direction A also moves angular member 221 and causes the point of contact with head 81 to move along the surface of angular member 221 in direction B. Likewise, if operator shaft 401 is adjusted in direction B, piston head 81 moves downward along the surface of angular member 221 in direction A. The movement of piston head 81 in directions A or B with respect to angular member 221 controls the opening and closing displacement of bypass valve 65.

If the static relationship between piston head 81 and angular member 221 is changed either in direction A or B as described above, the distance piston 80 will travel within cavity 66 will change proportionally. Angular member 221 has an upper portion 221a and a lower portion 221b. By adjusting the static contact point of head 81 along the surface of angular member 221 toward either portions 221a or 221b, head 81 will be displaced based on this static (or starting) position. For example, if angular member 221 is adjusted such that head 81 has a static contact point closer to portion 221a, head 81 has less surface area of angular member 221 to traverse. With less surface area of angular member 221 to traverse, shaft 80 will be displaced more within cavity 66.

The displacement of shaft 80 within cavity 66 determines the open distance D of the bypass valve 65. Likewise, if angular member 221 is adjusted such that head 81 has a static contact point closer to portion 221b, head 81 has more surface area of angular member 221 to traverse, i.e. toward end 221a. With more surface area of angular member 221 to traverse, piston 80 will be displaced a lesser distance within cavity 66, thereby increasing the open distance D of bypass valve 65. In other words, the distance which piston 80 travels (and consequently the distance D bypass valve 65 opens) depends on the static contact point between head 81 and angular member 221. By adjusting the point at which head 81 contacts angular member 221 using operator pin 401, an operator may field adjust the flow capability through bypass portion 40 of valve 10 quickly and easily.

In previous ARC valves, the bypass valve opening parameter D was factory set prior to shipment to a customer. However, if adjustments were needed during field installation, an installer had to remove the piston 80, and update as to the needed adjustment parameters and reassemble the valve. The present invention avoids these issues by providing a bypass flow valve capable of easy field adjustability.

While the present invention has been disclosed with reference to certain preferred embodiments, numerous modifications, alterations, and changes to the described embodiments are possible without departing from the sphere and scope of the present invention, as defined in the appended claims. Accordingly, it is intended that the present invention not be limited to the described embodiments, but that it have the full scope defined by the language of the following claims, and equivalents thereof.

What is claimed is:

1. An adjustable automatic recirculation valve comprising:
a valve body defining a main valve cavity and a recirculating outlet, said main valve cavity having a main inlet and a main outlet;
a main valve disk positioned within said main valve cavity sensing flow of fluid between said main inlet and said main outlet;
a bypass valve responsive to opening and closing of said main valve disk for controlling the flow of fluid between said main inlet and said recirculating outlet; and
a dynamic adjustment assembly housed within said valve body configured to control the distance D associated with the opening of said bypass valve to regulate the flow of fluid to said recirculating outlet, said dynamic adjustment assembly including:
an operator shaft having a first end and a second end, said first end located near an outer surface of said valve body;
a pivot arm having a first end connected to said second end of said operator shaft and
a pivot lever connected to a second end of said pivot arm, said pivot lever capable of angular rotation toward said main inlet and outlet of said main valve cavity.

2. The adjustable automatic recirculation valve in accordance with claim 1 further comprising a shaft positioned within said valve cavity, said main valve disk capable of displacement along said shaft coaxially with fluid flow between said main inlet and said main outlet.

3. The adjustable automatic recirculation valve in accordance with claim 2 further comprising a main valve seat within said valve body, said main valve seat configured to engage a perimeter of said valve disk to create a seal therebetween and prevent fluid flow between said main inlet and said main outlet.

4. The adjustable automatic recirculation valve in accordance with claim 1 further comprising a recirculation body integrally formed with said valve body, said recirculation body having a first end defining said recirculating outlet and a second end contiguous with said main valve cavity.

5. The adjustable automatic recirculation valve in accordance with claim 4 further comprising a recirculation cavity defined within said recirculation body, said bypass valve positioned within said recirculation cavity at said second end.

6. The adjustable automatic recirculation valve in accordance with claim 5 wherein said bypass valve controls fluid flow from said main valve cavity into said recirculation cavity.

7. The adjustable automatic recirculation valve in accordance with claim 6 further comprising a bypass valve seat positioned within said recirculation cavity, said bypass valve seat configured to engage at least a perimeter of said bypass valve sufficient to create a seal therebetween and prevent fluid flow between said main valve body and said recirculating outlet.

8. The adjustable automatic recirculation valve in accordance with claim 7 further comprising a recirculation piston positioned within said cavity and extending from said bypass valve to said recirculation outlet.

9. The adjustable automatic recirculation valve in accordance with claim 8 wherein said recirculation piston includes a plurality of rings integrally spaced along said piston.

10. The adjustable automatic recirculation valve in accordance with claim 8 wherein said piston includes a head end.

11. The adjustable automatic recirculation valve in accordance with claim 10 wherein said pivot lever including an angular surface in movable contact relationship with said head end of said piston.

12. The adjustable automatic recirculation valve in accordance with claim 11 wherein adjustment of said operator shaft moves the contact relationship between said head end of said piston and said angular surface of said pivot lever.

* * * * *